United States Patent [19]
Udagawa et al.

[11] Patent Number: 6,101,292
[45] Date of Patent: *Aug. 8, 2000

[54] IMAGE PROCESSING METHOD AND APPARATUS

[75] Inventors: Yoshirou Udagawa, Minamisaitama-gun; Masato Ikeda, Higashikurume; Eiichiro Ikeda, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,409

[22] Filed: Apr. 25, 1996

[30] Foreign Application Priority Data

May 1, 1995 [JP] Japan ..................................... 7-107325
Apr. 17, 1996 [JP] Japan ..................................... 8-095314

[51] Int. Cl.[7] .............................. G06K 9/32; G06K 9/00; G06G 5/00; H04N 1/387
[52] U.S. Cl. ......................... 382/299; 382/166; 345/127; 358/452; 358/453
[58] Field of Search ................................... 382/299, 305, 382/403, 404, 166; 345/127, 131, 132; 358/451, 452, 444, 445, 447, 523, 448, 450, 456; 348/97, 390

[56] References Cited

U.S. PATENT DOCUMENTS

| | | | |
|---|---|---|---|
| 4,182,311 | 1/1980 | Seppi et al. | 600/428 |
| 4,602,333 | 7/1986 | Komori | 348/390 |
| 4,969,204 | 11/1990 | Melnychuck et al. | 382/240 |
| 5,050,230 | 9/1991 | Jones et al. | 382/166 |
| 5,263,136 | 11/1993 | DeAguiar et al. | 345/511 |
| 5,488,433 | 1/1996 | Washino et al. | 348/722 |
| 5,537,157 | 7/1996 | Washino et al. | 348/722 |

OTHER PUBLICATIONS

"Compression Techniques for Still Image and Motion Video", S.O. Leung et al, IEEE TENCON '93/Beijing, 365–368 (1993).

*Primary Examiner*—Thomas D. Lee
*Assistant Examiner*—Wenpeng Chen
*Attorney, Agent, or Firm*—Fitzpatrick, Cella, Harper & Scinto

[57] ABSTRACT

An image processor in which desired image data can be read and displayed at a high speed when editing image data. Original image data is input, and a data conversion block generates standard image data whose capacity is smaller than that of the original image data. The generated standard image data and the input original image data are stored in an image data block so as to correspond to each other. When reading of image data stored in the image data block is instructed, the corresponding standard image data is read and is displayed on a page editing picture surface.

13 Claims, 14 Drawing Sheets

1001

1002

1003

IMAGE PROCESSING METHOD AND APPARATUS

BACKGROUND OF THE INVENTION

1. Field of the Invention

This invention relates to an image processing method and apparatus for printing or displaying image data or the like stored in an image file.

2. Description of the Related Art

Recently, there is an increasing demand for editing and forming documents according to the so-called DTP (desktop publishing). In DTP, characters, one or more figures, one or more tables or the like are arranged in a region (page) having a desired size to provide a file (in software), which can be printed out. In such a case, when changing the layout of respective components arranged on a page constituting a document, it is necessary to assign an area to be moved and to perform the processes of (I) segmenting→(II) copying to an intermediate buffer→(III) moving the assigned area to a desired area.

When arranging new image data as a component, layout is performed according to the processes of (I) opening data→(II) copying to an intermediate buffer→(III) moving the copied data to a desired area.

In accordance with the recent provision of a multimedia-platform environment, in some systems, a moving-image file can be displayed on a monitor picture surface by laying it out in a window within a page picture frame as a component. It is also possible to assign a frame for such a moving picture, and to print the image of the page including the frame.

However, in accordance with an increasing demand for high-quality output pictures, many problems have arisen. For example, the processing speed decreases or the quality of a printed-out picture is degraded as a result of a request for a high-quality image, such as a high-resolution component image, an image having a wide dynamic range, or the like.

For example, when laying out simple figure data (such as binary image data) in a page in DTP, since the amount of image data is relatively small, a great deal of time is not required for (I) opening of a figure data file and (II) copying to an intermediate buffer. Also when (III) moving the data to a desired area, positioning can be performed substantially in real time in a state in which no time difference is present between a pointer on the picture surface and the movement of a pointer-instructing member (for example, a mouse).

However, if the data to be dealt with comprises a high-quality natural image, execution of the above-described processes takes a very long time because the amount of data greatly increases, and therefore cannot be practically used. If the number of pixels of image data is reduced in advance (i.e., if the amount of data is reduced), the above-described operation is performed at a high speed. However, when printing the corresponding image, the resolution of the image is reduced, and therefore the quality of the image is degraded.

When a data image is a moving image, for example, an image represented by an NTSC signal having a rate of $\frac{1}{60}$ second, consider a case in which an editing operation is performed by laying out a window for the image in a page. Such an operation is mostly performed on a monitor having a large number of pixels, such as a VGA (video graphics array) monitor (640×480 pixels). The maximum size of the set and displayed window comprises 640×480 pixels. When laying out a window for a moving image, as shown in FIG. 17, the window for the moving image generally comprises about 160×120 pixels. Of course, when viewing the picture on a VGA monitor, the reduced state of 160×120 pixels causes no problem. However, when displaying the picture on other systems (for example, a projector having a large number of pixels), the number of pixels in the entire page may increase. In such a case, character portions are magnified without being influenced by the number of pixels by using an outline font or the like. On the other hand, since only the portion of the moving-image window comprises a magnified image obtained by interpolating the original image of 160×120 pixels, the quality of the image of this portion is inferior. This is also true when printing one picture frame.

The same problem also arises when the frame rate differs. That is, when displaying a moving-image file and a page layout converted into display data for a monitor which cannot perform a display having a rate of $\frac{1}{60}$ second due to restriction in the memory capacity, the capability of a D/A (digital-to-analog) converter or the like on a display which can perform a display at a rate of $\frac{1}{60}$ second, a considerably insufficient result is obtained.

In order to solve such problems, a technique is disclosed, for example, in Japanese Laid-Open Patent Application (Kokai) No. 3-4151 (1991), in which when laying out an image on a page, a file name is displayed instead of displaying data by moving the data. When printing the image, image data of the file corresponding to the file name is retrieved and printed. According to this approach, a high-quality image can be printed. However, the layed out page is merely a printing procedure which cannot be freely modified or utilized. In addition, actually required functions, for example, processing, such as reduction, magnification or the like, of an image, adjustment of the layout position, and the like cannot be performed in real time.

A system of which uses original data and data obtained by skipping some of the original data for image retrieval is disclosed in Japanese Laid-Open Patent Application (Kokai) No. 2-11927 (1990). This system, however, cannot perform page layout and the like, and no solution of problems due to a difference between output apparatuses is presented.

SUMMARY OF THE INVENTION

The present invention is made in consideration of the above-described problems.

It is an object of the present invention to provide an image processing method and apparatus which can read and display desired image data at a high speed when editing image data.

It is another object of the present invention to provide an image processing method and apparatus which can use original image data or standard image data having a smaller data amount than the original image data in accordance with the use of the image data.

It is still another object of the present invention to provide an image processing method and apparatus which can edit moving-image data at a high speed while segmenting the data.

According to one aspect, the present invention which achieves these objectives relates to an image processing apparatus comprising image generation means for inputting original image data and generating standard image data having a smaller data capacity than the original image data, image storage means for storing the standard image data generated by the image generation means and the original image data so as to correspond to each other, and display control means for reading and displaying the standard image data on display means when reading of image data stored in the image storage means has been instructed.

According to another aspect, the present invention which achieves these objectives relates to an image processing method comprising the steps of inputting original image data and generating standard image data having a smaller data capacity than the original image data, storing the standard image data and the original image data so as to correspond to each other, and reading and displaying the standard image data when reading of image data has been instructed.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

First Embodiment

A first preferred embodiment of the present invention will now be described in detail with reference to the drawings.

Figure 1:
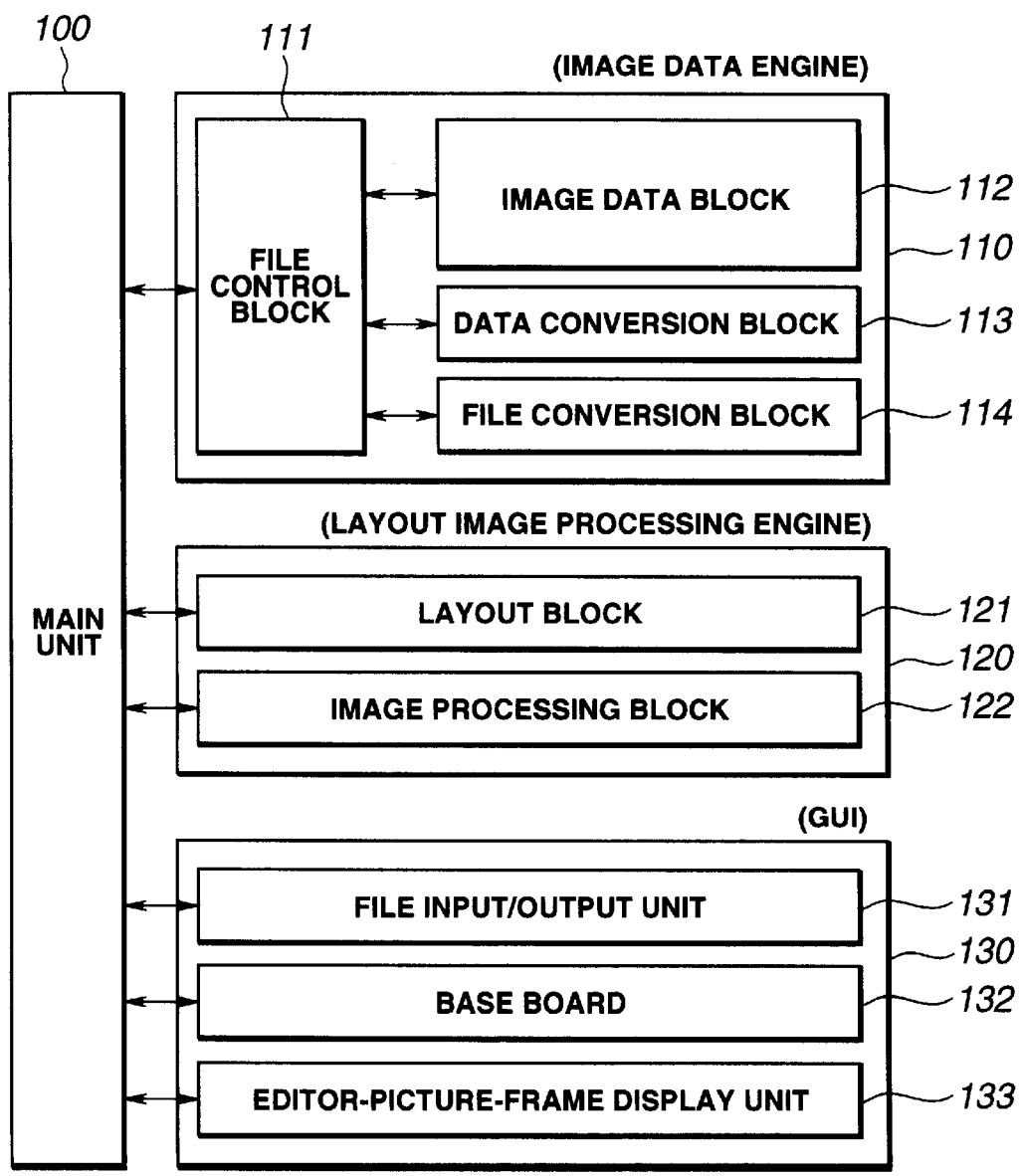
FIG. 1 is a block diagram illustrating the configuration of respective functions of an electronic album according to a first embodiment of the present invention.

FIG. 1 is a block diagram illustrating respective functions, such as a layout function, a image processing function and the like, of an electronic album. The electronic album grossly includes a main unit 100, an image data engine 110, a layout image processing engine 120, and a GUI (graphical user interface) 130.

Figure 2:
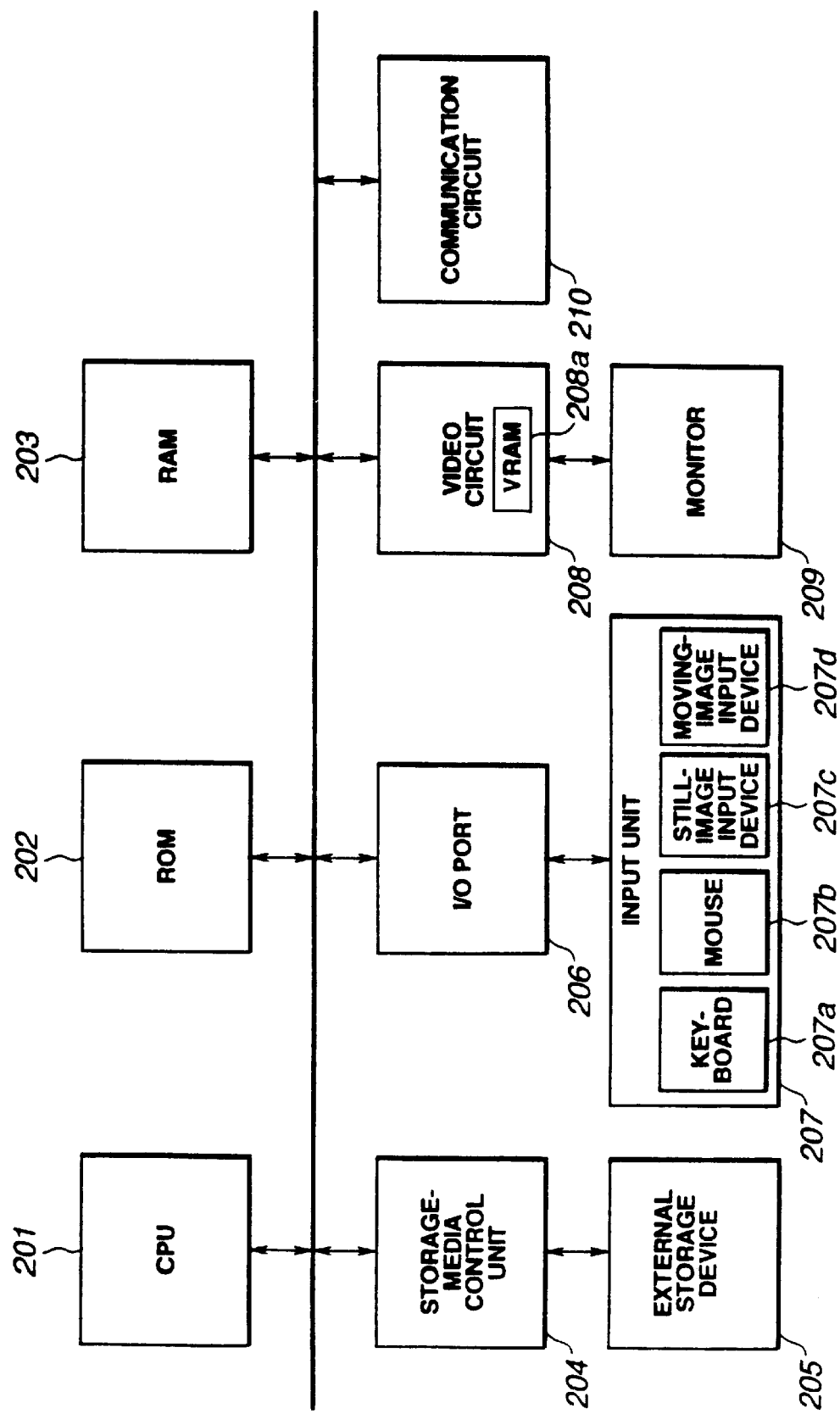
FIG. 2 is a block diagram illustrating the configuration of the electronic album shown in FIG. 1.

FIG. 2 is block diagram illustrating the configuration of the electronic album shown in FIG. 1.

In FIG. 2, a CPU (central processing unit) 201 controls the entire apparatus according to processing programs stored in a ROM (read-only memory) 202, and realizes functions to be described later. The ROM 202 stores in advance various processing programs and various data. A RAM (random access memory) 203 is used as work regions for the CPU 201 and regions for temporarily storing image data. An external storage device 205 comprises hard disks, optical disks or the like, and stores image data and the like used in the present embodiment. The CPU 201 accesses the external storage device 205 via a storage-medium control unit 204. An input unit 207 comprises a keyboard 207a, a mouse 207b, a still-image input device 207c, such as a scanner, an electronic still-picture camera or the like, a moving-image input device 207d, such as a video camera or the like, and inputs data and instructions for the entire apparatus via an I/O (input/output) port 206. A monitor 209 serves as a display device, and displays image data input via a video circuit 208. The video circuit 208 includes a VRAM 208a having the capacity for the picture surface of the monitor 209. A communication circuit 210 connects the apparatus to an external apparatus via a communication network.

The outline of the processing of the present embodiment will now be described.

A location of storage of an image taken by a scanner (or an electronic still-picure camera or the like) is determined by assignment of a file by a file input/output block 131 of the GUI 130 (FIG.1).

When the file has been assigned, the image taken by the scanner passes through a file control block 111 of the image data engine 110, and is converted by a data conversion block 113 or by a file conversion block 114 whenever necessary. Then, the image is stored in an image data block 112 as album data. This processing will be described later.

The image data thus stored in the image data block 112 can be seen at an arbitrary timing by assigning it on the picture surface. The file conversion block 114 decodes image data encoded according to a JPEG (Joint Photographic Experts Group) method or the like into noncompressed data. A baseboard 132 is used, for example, when moving image data on a page picture surface. An editor-picture-frame display unit 133 is started when performing an editing operation while displaying a picture frame for one page, and is used, for example, when displaying an image on the picture surface of the monitor 209, or when setting a position where an image is to be pasted.

The data stored in the image data block 112 can be output as an image file or printed (as a hard copy) after performing processing, such as page layout, gamma correction or the like, by the layout image processing engine 120.

Next, a description will be provided of the configuration of the image data engine 110.

Figure 3:
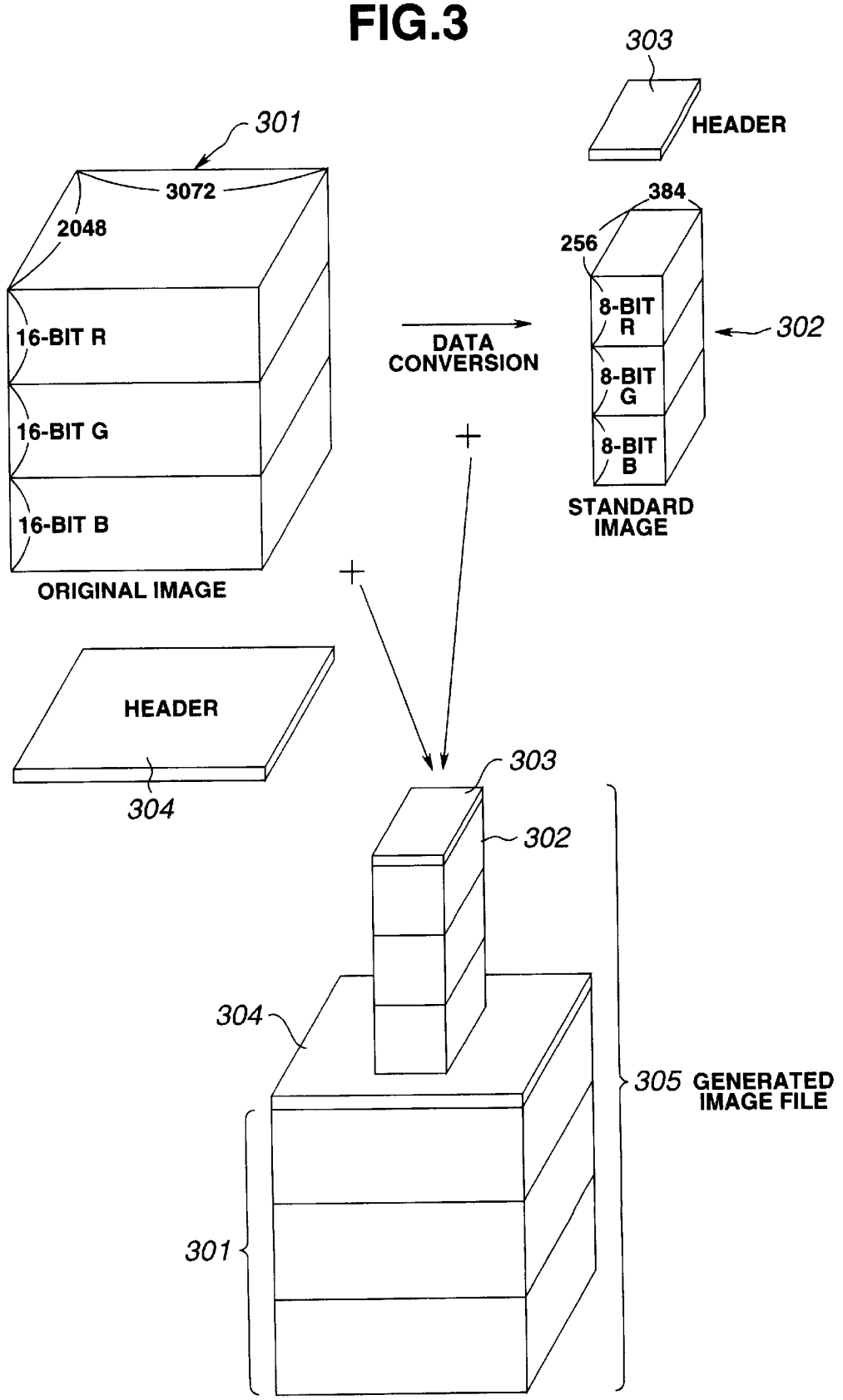
FIG. 3 is a schematic diagram illustrating the configuration of an image data file in the first embodiment.

FIG. 3 is a schematic diagram illustrating generation of standard image data, which is image data reduced from input original image data, by the image data engine 110.

The still-picture input device 207c inputs high-picture-quality original image data 301 comprising 3072×2048 pixels and 16 bits for each of R, G and B colors.

The input original image data 301 is temporarily stored in the RAM 203, and is then converted into standard image data 302 by the data conversion block 113. In the present embodiment, the data conversion block 113 is realized by execution of a program stored in the ROM 202 by the CPU 201. However, the data conversion block 113 may be realized using dedicated hardware.

As shown in FIG. 3, the standard image data 302 comprising 384×256 pixels and 8 bits for each of R. G and B colors is generated. Conversion from the original image data 301 comprising 3072×2048 pixels into the standard image data 302 comprising 384×256 pixels may be performed by reducing the entire original image data 301 (in the present embodiment, an area ratio of 1/64), or by segmenting or reducing a portion of the original image data.

Conversion from 16 bits for each color into 8 bits for each color may be performed by overall compression from white to black, compression around white (so-called high-light emphasis), or compression around dark portions (a low-key tone). Such adjustment may be performed such that common conversion is performed based on preset values, or may be arbitrarily set through the keyboard 207*a* in accordance with situation.

Header information 303 generated by the CPU 201, comprising information relating to the number of pixels and information obtained when the standard image data has been generated (for example, segmenting of a portion of the image, highlight emphasis, a low-key tone or the like), is added to the standard image data 302 generated in the above-described manner, and header information 304 relating to the original image data 301 is added to the original image data 301. Thus, an image file 305 is generated.

As described above, since the header information 304, including information relating to the number of pixels, and the like of the original image data 301, is added to the original image data 301, sets of header information 303 and 304, and the original image data 301 and the standard image data 302 are present in the generated image file 305.

Figure 7:
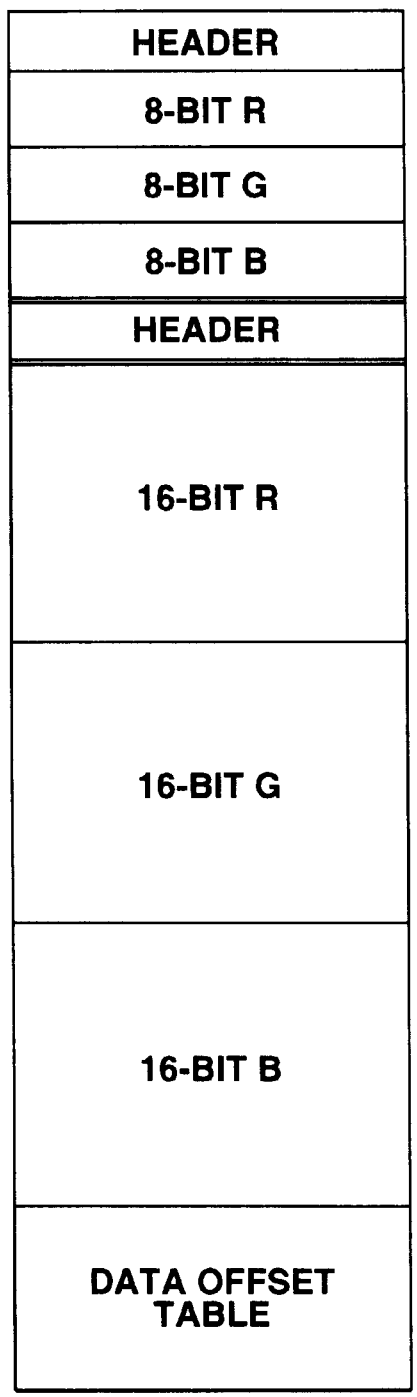
FIGS. 7(1) and 7(2) are diagrams each illustrating an arrangement of an image file in a storage medium.
Figure 7:
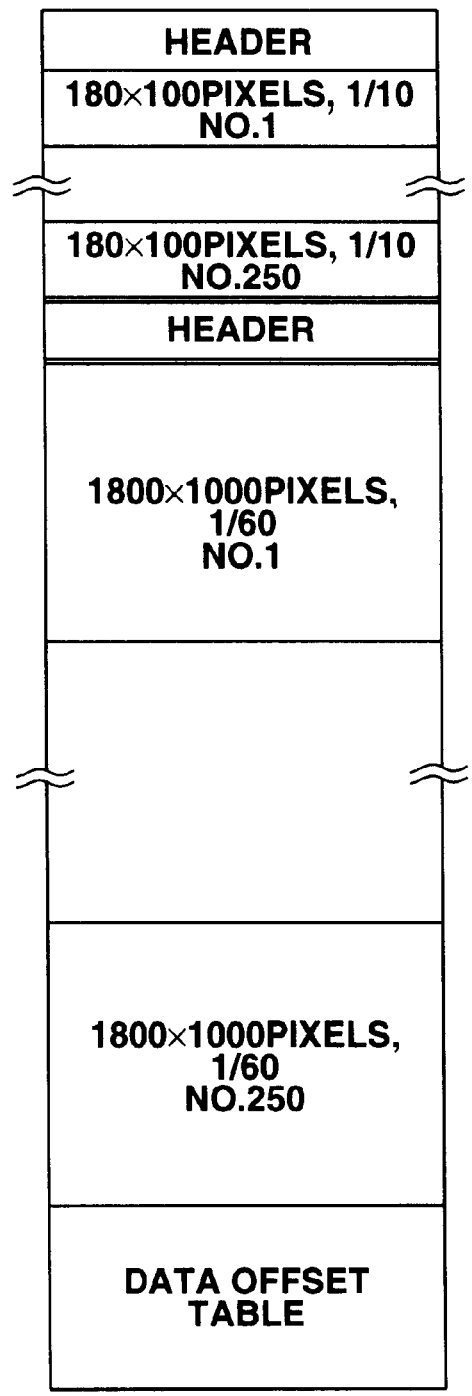

FIG. 7(1) illustrates arrangement of such sets of information within the memories (the RAM 203 and the external storage device 205). In FIG. 7(1), a data offset table has the role of an address book in which addresses within the memories are written.

A title is added to the generated image file 305 through the keyboard 207*a*, and the resultant image file 305 is stored in the external storage device 205.

Figure 4:
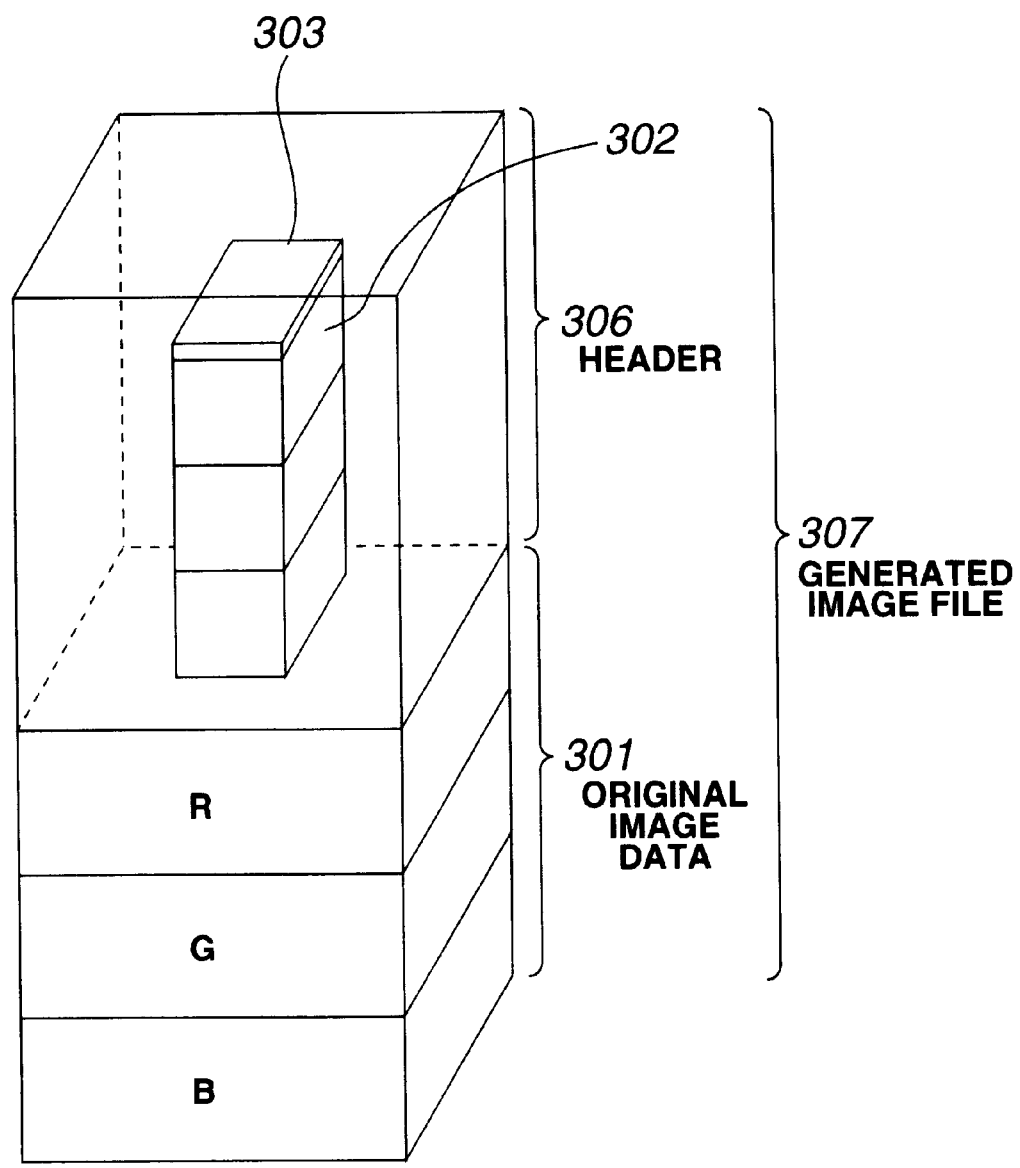
FIG. 4 is a schematic diagram illustrating the configuration of another image data file in the first embodiment.

FIG. 4 illustrates the configuration of another generated image file 305.

In FIG. 4, (standard image data 302+header information 303) are stored as a part of header information 306 of the original image data 301.

Addition of the standard image data 302 to the original image data 301 may give the impression that the entire amount of data is increased. However, since the amount of data of the reduced standard image data 302 (about 288 KB (kilobits) in the present embodiment) is much smaller than the amount of data of the original image data 301 (about 36 MB (megabits)), the amount of the increase is relatively small.

When viewing the image file generated in the above-described manner on the picture surface, a summary of image files stored in the external storage device 205 is first displayed on the monitor 209. By assigning an arbitrary image file through the keyboard 207*a* or the mouse 207*b*, the standard image data 302 of the assigned image file is opened.

Since the capacity of the file of this standard image data 302 is small, it is possible to read the standard image data 302 at a high speed, to store it in the RAM 203 as well as in the VRAM 208*a*, and to depict it on the picture surface of the monitor 209. At that time, the header information 303 of the standard image data 302 may also be displayed.

When displaying the standard image data 302 on the picture surface of the monitor 209, if the picture quality of the displayed image data is insufficient, (the original image data 301+the header information 304) are opened by an instruction through the keyboard 207*a* or the mouse 207*b*, and are displayed on the picture surface of the monitor 209.

By instructing the size of the standard image data 302 through the keyboard 207*a* in the state of displaying the original image data 301, the size may, for example, be changed to a size comprising 512×768 pixels.

If data to be displayed is allowed to be rougher than the standard image data 302, the size of the standard image data 302 may be changed to a smaller size, for example, a size comprising 128×192 pixels, by performing instruction through the keyboard 207*a*.

Although in the present embodiment, the size of the standard image data 302 is made to be a size comprising 384×256 pixels and 8 bits for each of R, G and B colors, the size may be arbitrary set through the keyboard 207*a*.

Figure 5:
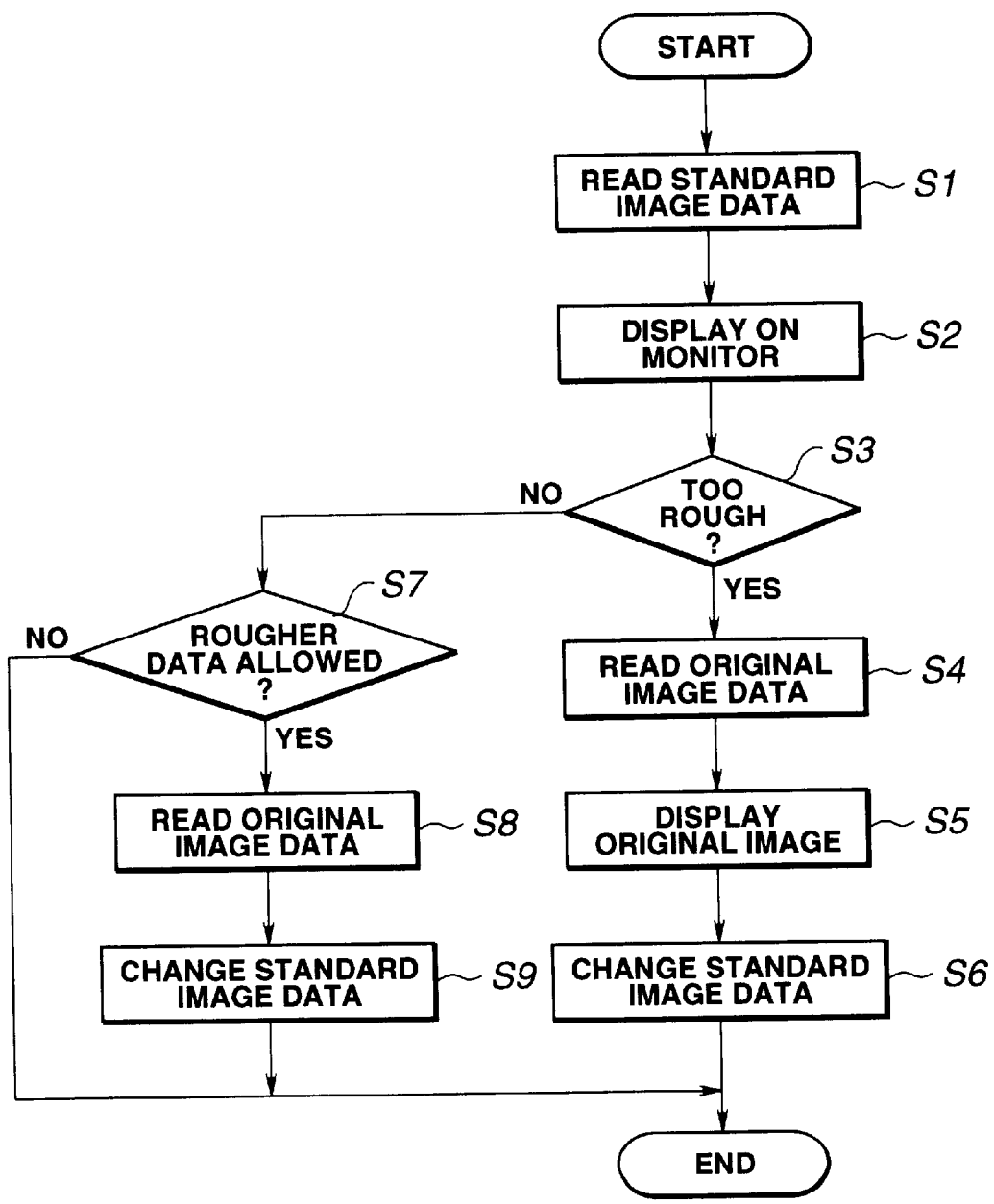
FIG. 5 is a flowchart illustrating a process of reading an image file in the first embodiment.

FIG. 5 is a flowchart illustrating the processing of reading and displaying the above-described image file.

When an image file has been assigned from the summary of image files displayed on the monitor 209 through the keyboard 207*a* or the mouse 207*b*, the standard image data 302 of the assigned image file is read from the external storage device 205 (step S1) and is stored in the RAM 203 and the VRAM 208*a*, and the corresponding standard image is displayed on the monitor 209 (step S2). The contents of the header information 303 may be displayed together.

In step S3, the operator determines if the displayed standard image is too rough from the viewpoint of picture quality. If the result of the determination is affirmative, the process proceeds to step S4, where the original image data 301 is read from the external storage device 205 to the RAM 202. In step S5, the read original image data 301 is stored in the VRAM 208*a*, and the original image is displayed on the monitor 209. The process then proceeds to step S6, where new standard image data is generated by inputting the size of the standard image data through the keyboard 207*a*, and the generated data is stored in the above-described manner, so that a substantially finer image can be displayed.

If the result of the determination in step S3 is negative, the process proceeds to step S7, where the operator determines if the standard image data is allowed to be rougher. If the result of the determination in step S7 is affirmative, the process proceeds to step S8, where the original image data 301 is read. In step S9, the standard image data 302 is changed or modified based on the read original image data 301, and the resultant data is stored.

If the result of the determination in step S7 is negative, the process is terminated.

Second Embodiment

Next, a description will be provided of a second embodiment of the present invention.

In the second embodiment, a description will be provided of a case in which after changing the layout or the tone of an image using the layout image processing engine 120, the resultant image data is printed.

Figure 6:
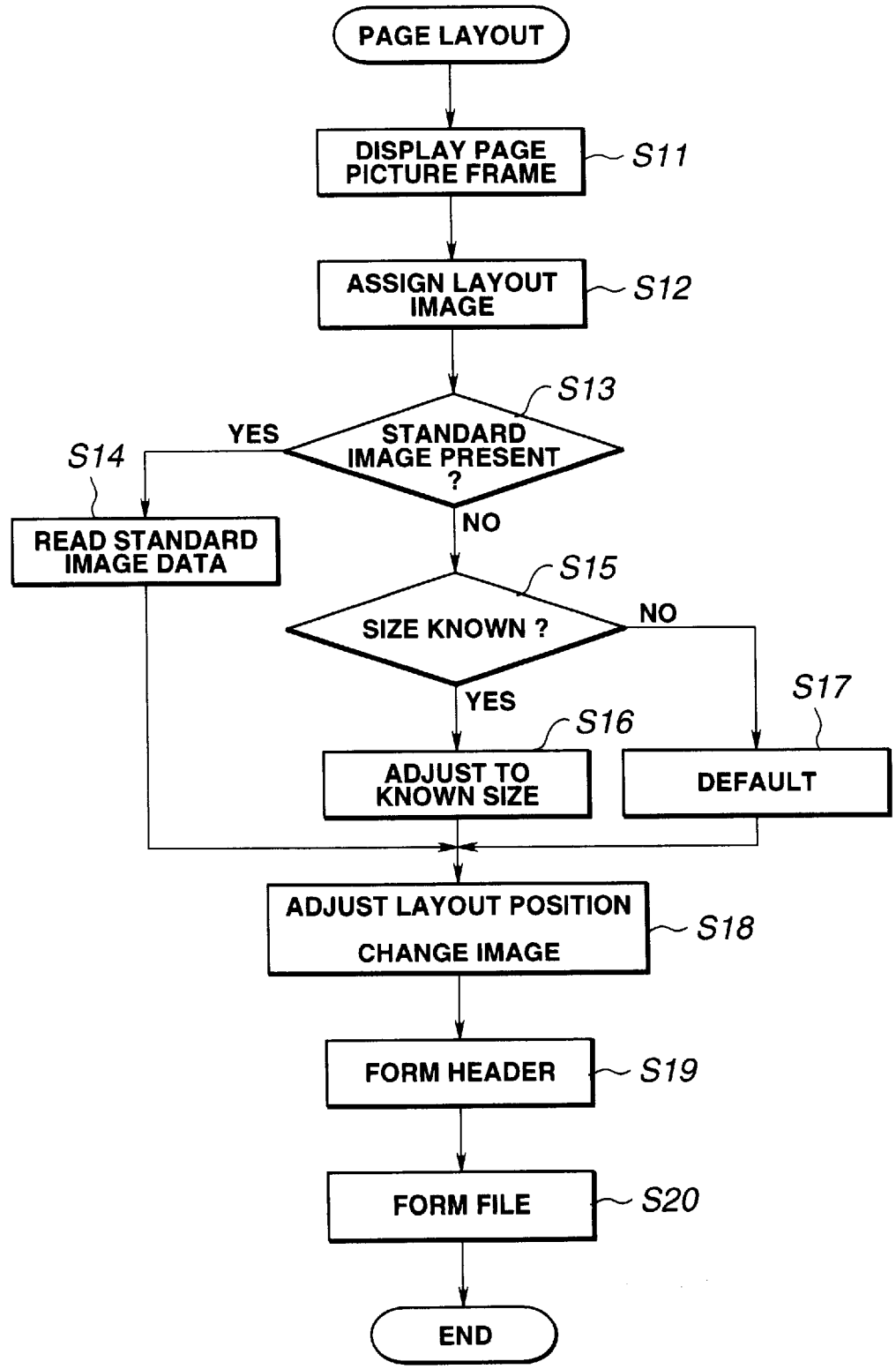
FIG. 6 is a flowchart illustrating a process of forming a page layout according to a second embodiment of the present invention.

FIG. 6 is a flowchart illustrating the processing of the second embodiment.

First, in step S11, a page picture frame serving as the base for layout is opened. That is, a region for one page is secured in the RAM 203, and is displayed on the monitor 209.

When an image to be layed out has been assigned through the keyboard 207*a* or the mouse 207*b* in step S12, the corresponding image file stored in the external storage device 205 is opened. When the standard image data 302 has already been generated in this image file and has been added to the original image data 301, the process proceeds from step S13 to step S14, where only the standard image data 302 is read and stored in a base board 132. In the second embodiment, this base board 132 is realized by securing a region in the RAM 203.

When it has been determined in step S13 that the standard image data 302 has not been generated (not added to the original image data 301), the process proceeds to step S15, and the standard image data 302 is generated as described in the first embodiment. If the image size as the target of layout adjustment is known (for example, when the number of pixels has been instructed through the keyboard 207a) in step S15, the process proceeds to step S16, where the size is adjusted to a size having the known number of pixels. If there is no instruction for the image size as the target of layout adjustment in step S15, the process proceeds to step S17, where the number of pixels is set to a standard default value. At that time, if the determined number of pixels is greater than the default value (if the standard image data of the default value has a greater resolution value than the final standard image data), the standard image data 302 is generated again from the original image data 301.

Thus, the process proceeds to step S18, where the layout position is adjusted using a pointing device, such as the mouse 207b or the like, or the tone of the image is changed (for example, gamma conversion, control conversion or the like), while displaying the standard image data 302 stored in the base board 132 on the picture surface. The image may also be reduced or magnified. When the layout position, the tone, the size and the like of the image have been determined, the process proceeds to step S19, where the contents of the setting and processing are written in the header information. The header information at that time is added to image data layed out in the page. The contents of change from the original image data to the standard image data and to image data layed out in the page are described in the header information. The layed out image data is changed according to processing corresponding to the description.

If contents to be reflected on the image data are present in the above-described processing, the contents may be written in the header portion of the original data file (the original image data+the standard image data) stored in the external storage device 205.

The page data formed in the above-described manner is output as a file in step S20. That is, the page data is newly stored in the external storage device 205, or is out-put to a printer (not shown).

When outputting or printing the page data as an image file, the following operations can be performed.

First, when outputting the page data as a file, if the user does not require other data than the page data, the page data can be called (accessed) using link information with respect to the original data file in the image data block 112 even if it is not included in the main body of the processing apparatus. Accordingly, when original image data is not required for the page data, the file is output in the form of the page data.

When requiring original image data, the image file of the original image data is added to the page data file, so as to be taken out to external environment while being stored in an off-line storage medium, such as a floppy disk or the like.

When printing the page data, the data hierarchical layer of the layed out image data portion to be processed and used is changed in accordance with the capability of the printer. For example, when using a high-picture-quality printer capable of printing a picture frame for one page comprising 100,000×100,000 pixels, the image file of the original image data is called for the layed out image data portion, and is made to be printing data. Processing is performed in accordance with the setting for the tone of the image and the like recorded in the image header.

When printing the page data using a printer capable of printing a picture frame for one page comprising about 1,000×1,000 pixels, printing is performed using image data layed out in the page.

Although the case of printout has been described, the same processing may be performed also when displaying the page data on a liquid-crystal monitor or a projector.

According to the above-described configuration, when outputting the page data to a low-resolution output device, image data can be output at a high speed without using a high-picture-quality large-capacity image data file. When outputting the page data to a high-resolution output device, high-picture-quality image data can be output.

Next, a description will be provided of processing of data when editing image data.

Figure 8:
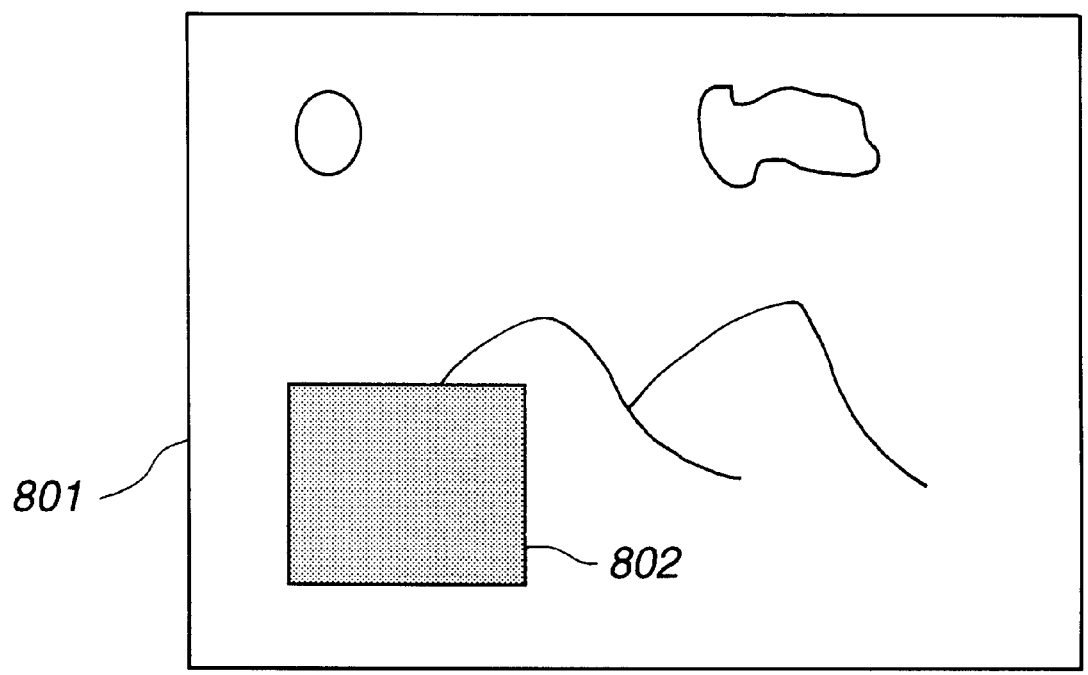
FIG. 8 is a diagram illustrating editing processing in the second embodiment.

FIG. 8 illustrates original image data 801 displayed on the monitor 209, and indicates a state in which a region 802 of the original image data 801 is assigned by the mouse 207b and is segmented.

Figure 9:
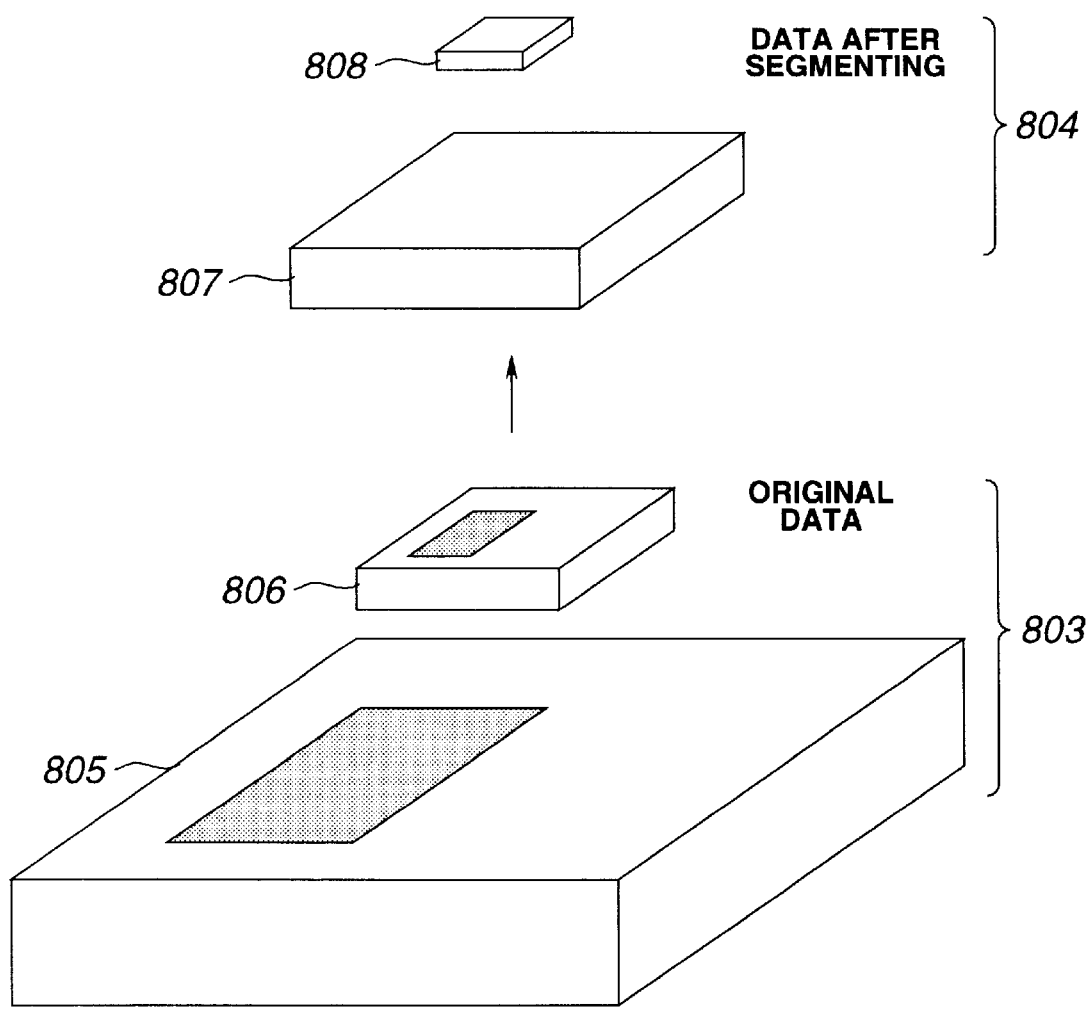
FIG. 9 is a schematic diagram illustrating an image file during editing processing in the second embodiment.

In this case, as shown in FIG. 9, the displayed original image data 801 corresponds to data 805 in original data 803. A hatched portion in the data 805 corresponds to the segmented portion 802. Data 806 is obtained by compressing the data 805.

By executing segmenting, data 807 segmented from the data 805, and data 808 obtained by compressing the data 807 are generated, and are stored as data 804 after segmenting, serving as a particular file.

Figure 10A:
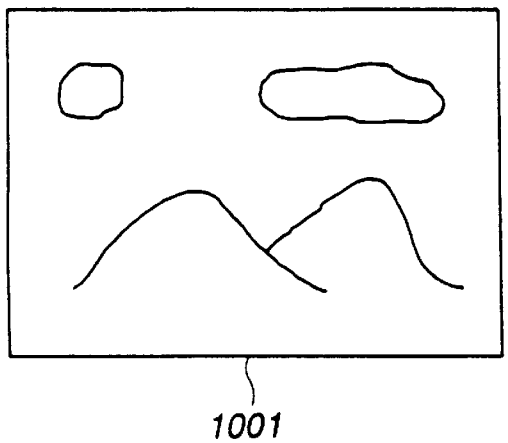
FIG. 10A–10C illustrate examples of display on a display picture surface in the second embodiment.
Figure 10B:
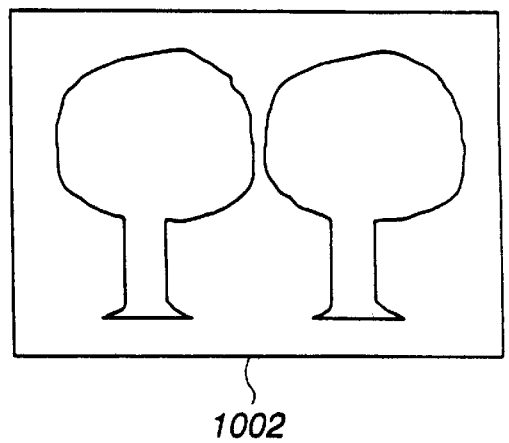
Figure 10C:
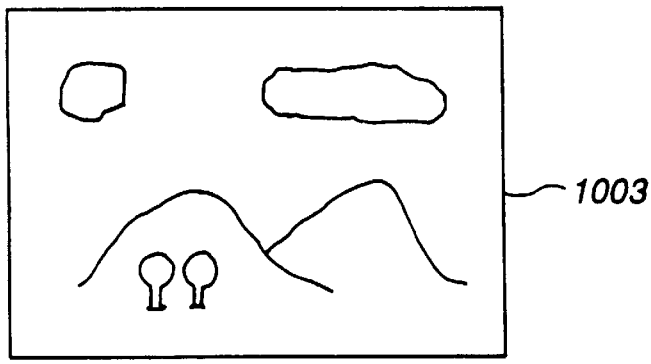

As shown in FIGS. 10A–10C, also in the case of data 1003 (FIG. 10C) formed by synthesizing data 1001 (FIG. 10A) and data 1002 (FIG. 10B), a particular file is generated and stored, as described with reference to FIGS. 8 and 9.

Third Embodiment

Next, a desription will be provided of a method for laying out a presentation window using a moving image according to a third embodiment of the present invention.

In the third embodiment, a case of providing a Hivision (the trade name of a high-definition television system) image as an input image will be described.

Figure 12:
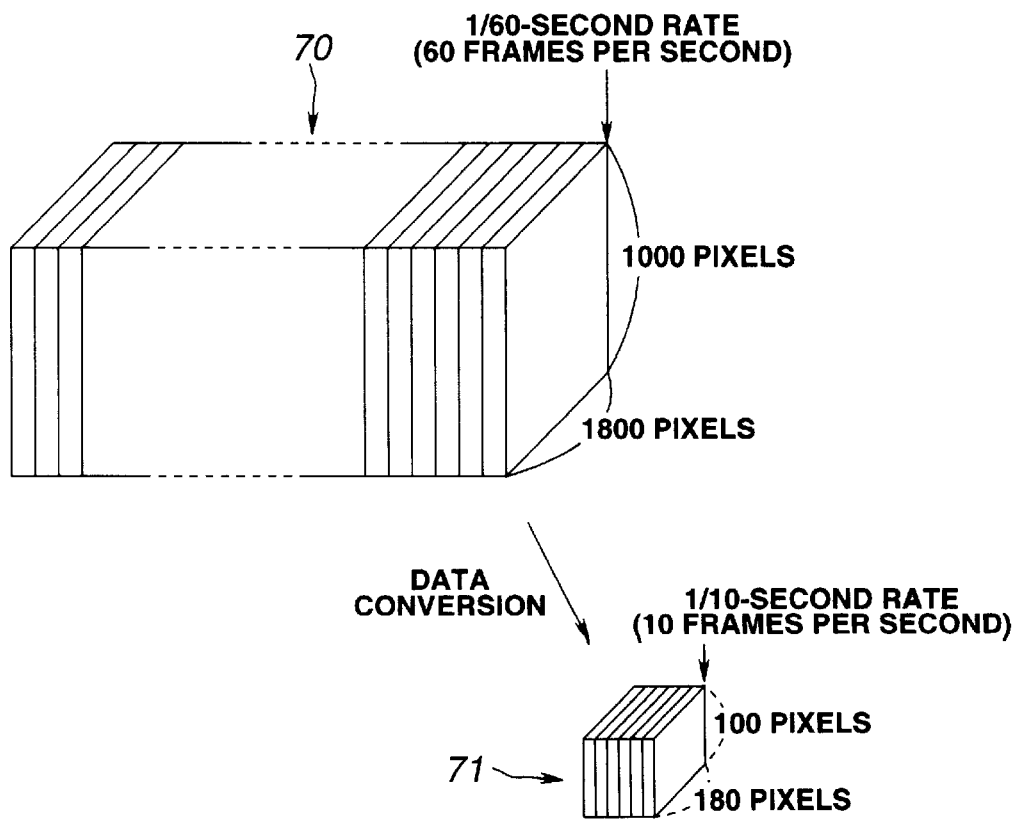
FIG. 12 is a schematic diagram illustrating the configuration of an image data file in the third embodiment.

Image data 70 (see FIG. 12) comprising about 1,800×1,000 pixels is sequentially input as a file from the moving-image input device 207d with a time interval of 1/60 second. Large-capacity data is, of course, filed during a long period of time. When inputting such image data, the amount of the data is, in some cases, reduced according to a compression program conforming, for example, to JPEG, MPEG (Moving Picture Experts Group) or like. The data thus input is stored in the image data block 112 (the external storage device 205) via the file control block 111 (realized in this embodiment by execution of a processing program stored in the ROM 202 by the CPU 201, though it may also be realized using dedicated hardware).

At that time, as described in the foregoing embodiment, a standard image data file may be immediately formed as in the case of a still-image file, or, as will be described later, may be formed after determining the picture-drawing rate and the size of the presentation window in the page.

A description will now be provided of a case of not immediately forming standard image data.

As in the second embodiment, when a moving-image file to be layed out in a page to be formed is selected, header information of the selected moving-image file is read from the external storage device 205, and a window having the number of pixels of original image data appears on the page (on the display picture surface of the monitor 209).

Figure 11:
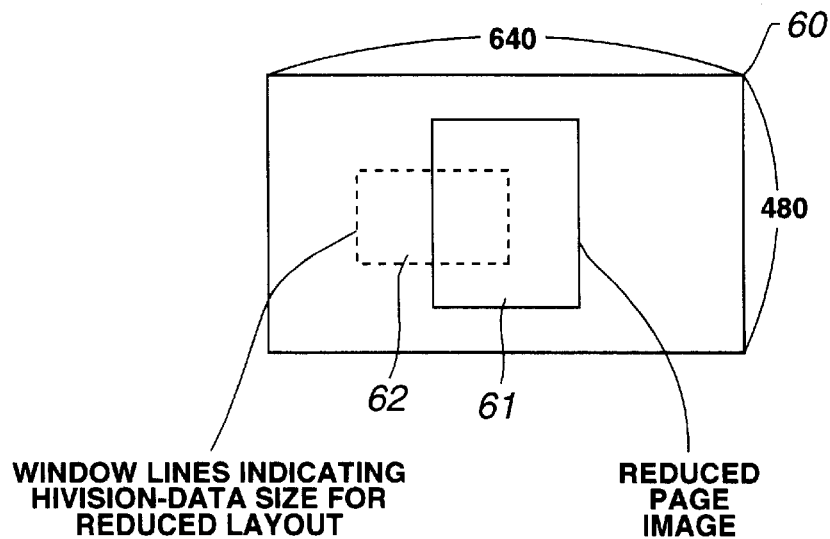
FIG. 11 is a schematic diagram illustrating an arrangement of images on a picture surface according to a third embodiment of the present invention.

For example, as shown in FIG. 11, when laying out Hivision moving-image data on a page picture frame 61 on a VGA monitor 60, since the number of pixels of the moving-image data is large, the entire moving-image data cannot be displayed unless the entire page picture frame 61 is displayed while being reduced.

By adjusting the lines of a displayed window 62 using the mouse 207b, the size of the window 62 is determined. The picture-drawing rate of the moving image to be displayed on the window 62 is input through the keyboard 207a. Moving-image data for presentation is formed from the corresponding moving-image file stored in the external storage device 205 based on the above-described data (the window size, the picture-drawing rate and the like).

If image data 71 for presentation comprises 180×100 pixels and has a rate of 1/10 second, original image data is decoded from data compressed according to the JPEG method into noncompressed data by the file conversion block 114 (realized in this embodiment by executing a processing program stored in the ROM 202 by the CPU 201, though it may be realized using dedicated hardware), so that both the number of pixels and the picture-drawing rate are reduced.

The obtained moving-image data may be compressed again according to the JPEG method or the like. Header information in which the method of conversion, and the like are described is added to that data, and the resultant data is stored in the external storage device 205 together with the original image data.

When printing out a picture frame from the image data 71 for presentation, header information of the corresponding data of the image data 71 in the page file is read. When performing printing using a high-resolution printer, printing is performed by referring to the header information using original image data in the image data block 112. When performing printing using a low-resolution printer, printing is performed using image data having a reduced rate in the page file. This processing is the same as in the above-described second embodiment.

Although in the third embodiment, correlation among respective hierarchies of image data has not been described, various hierarchy formats can be considered.

Figure 13:
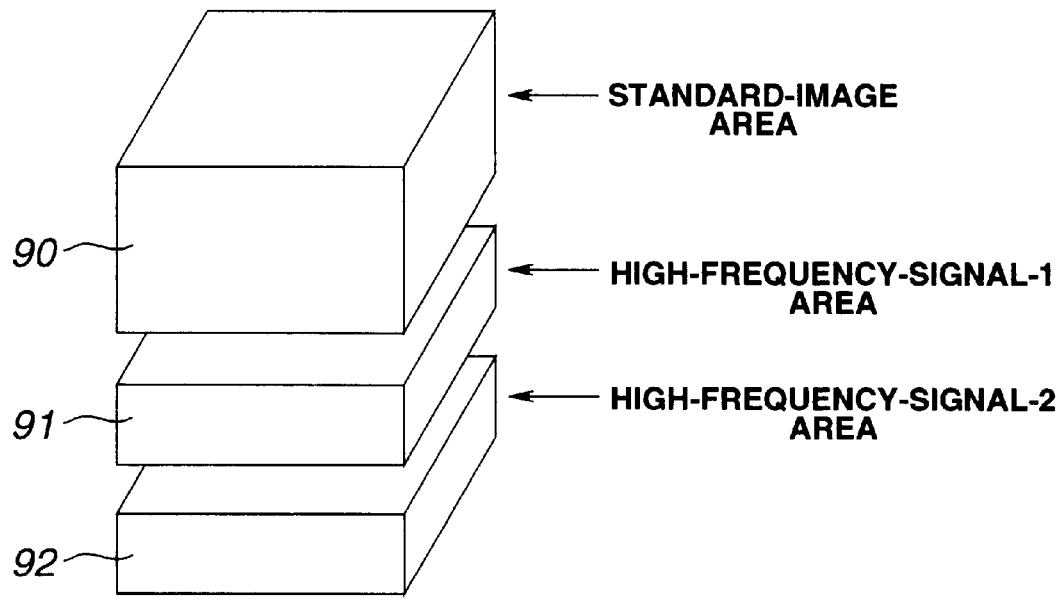
FIG. 13 is a schematic diagram illustrating the configuration of another image data file in the third embodiment.

FIG. 13 illustrates a case in which only standard image data 90 is held in an ordinary three-color plane, only high-frequency signals are held for data of higher-resolution hierarchies, and high-picture-quality data is obtained by adding the data of higher-frequency hierarchies to the standard image data 90. In FIG. 13, reference numeral 91 represents a high-frequency-signal-1 area, and reference numeral 92 represents a high-frequency-signal-2 area.

FIG. 7(2) illustrates an arrangement of the above-described data in the memories (the RAM 203 and the external storage device 205). In FIG. 7(2), a data offset table has the role of an address book in which addresses in the memories are written.

Figure 14:
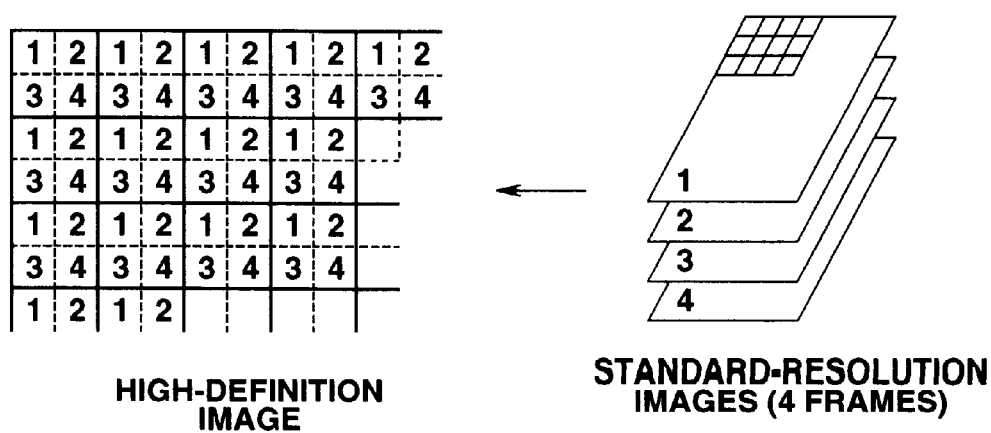
FIG. 14 is a schematic diagram illustrating the configuration of data obtained by shifting pixels in another image data file in the third embodiment.

FIG. 14 is a diagram illustrating the provision of hierachical layers of image data according to a so-called pixel shifting method. In FIG. 14, one pixel in a high-definition image is divided into four portions, and each of four subpixels is allocated to each hierachical layer (frame) of standard image data.

Figure 15:
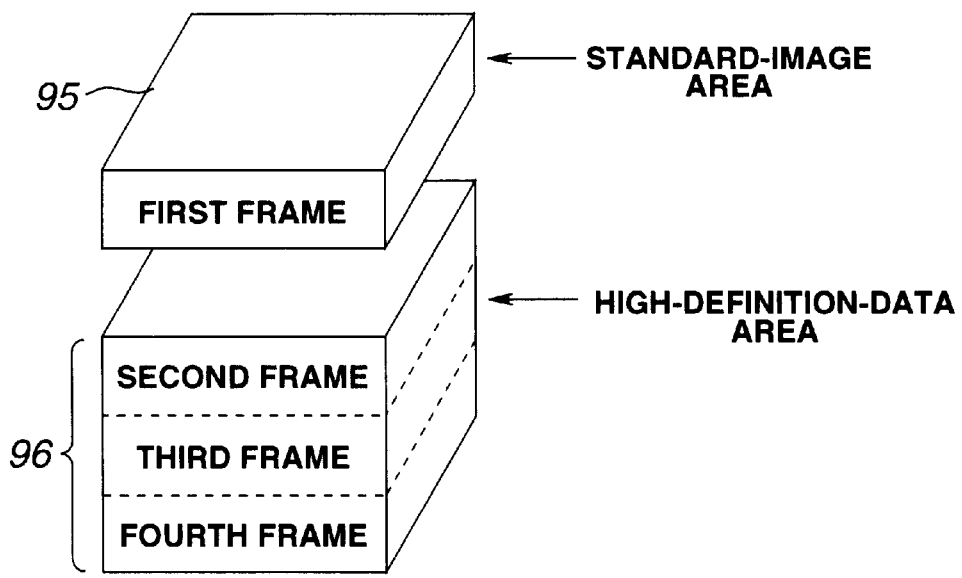
FIG. 15 is a schematic diagram illustrating the configuration of still another image data file in the third embodiment.

When a data file in which a high-definition-frame image is synthesized from images of four standard-resolution frames has been input in a form as shown in FIG. 15, data for one standard-resolution frame is held as standard image data 95, and remaining data 96 for three frames are held as data for forming high-definition image data. The data of two hierachical layers are used when forming high-definition image data.

Fourth Embodiment

Next, a description will be provided of a case in which a system is operated utilizing a network.

Figure 16:
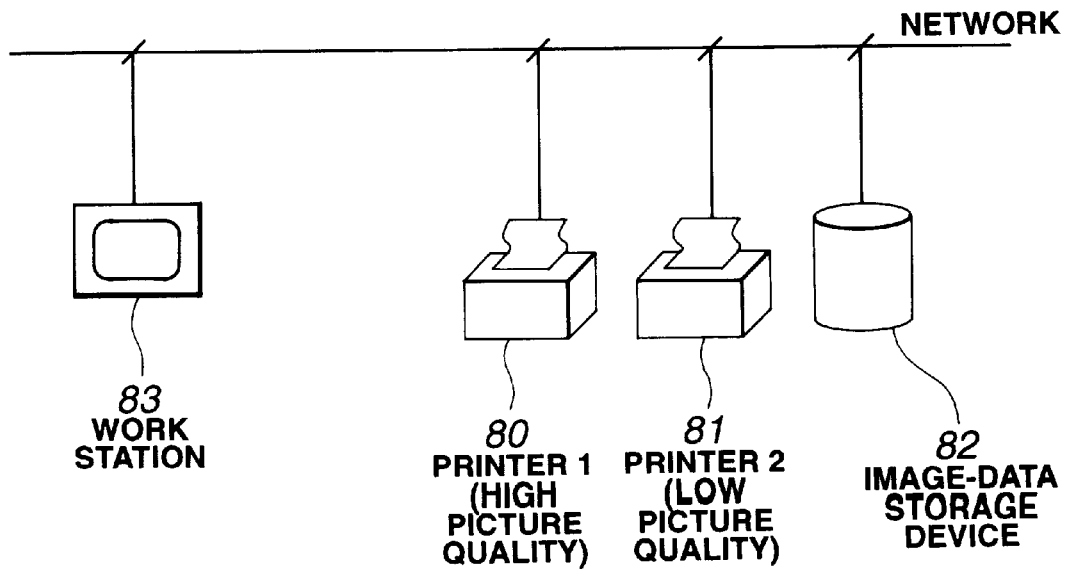
FIG. 16 is a schematic diagram illustrating the configuration of a network according to a fourth embodiment of the present invention.
Figure 17:
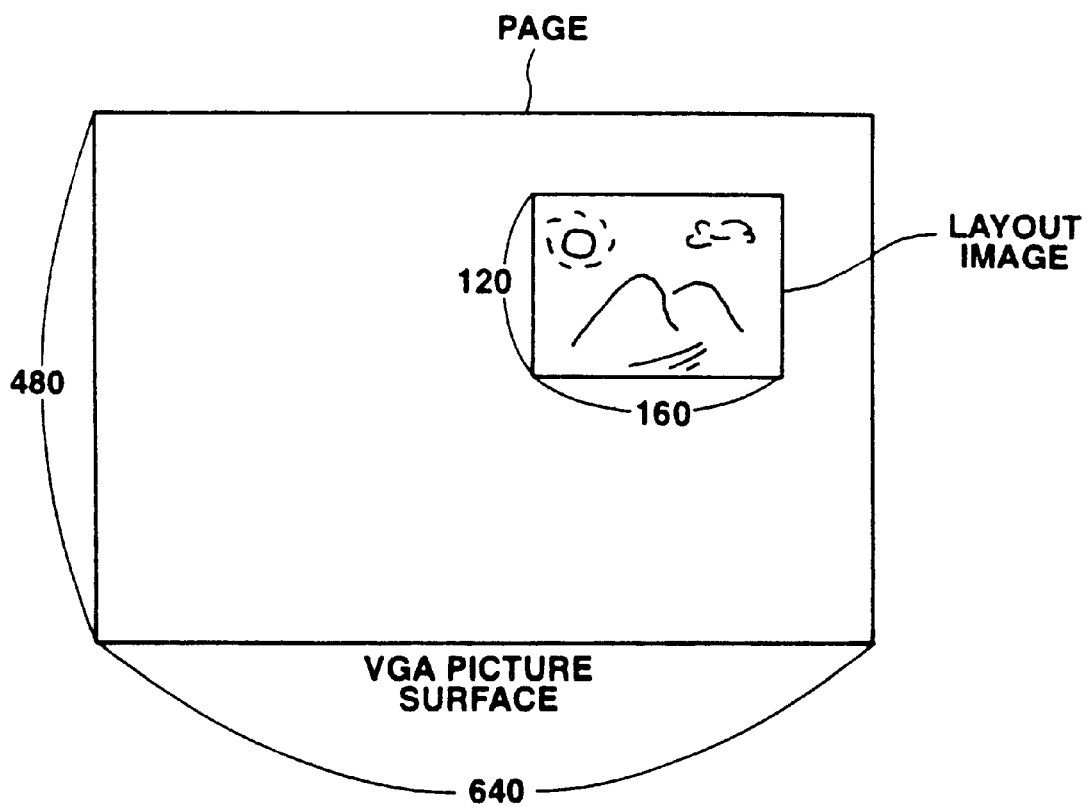
FIG. 17 is a diagram illustrating an example of display in a conventional approach.

FIG. 16 illustrates the configuration of the entire system. A work station 83 is configured as shown in FIGS. 1 and 2, and the external storage device 205 is connected on a network in an on-line state as an image-data storage device 82. Accordingly, the read/write of image data filing from the work station 83 is performed for the image-data storage device 82. It is thereby possible to provide allowance for the main storage device of the work station 83.

Data can be printed out from printers 80 and 81 having different resolutions connected to the network according to the above-described different processing methods. Reference numeral 80 represents a high-resolution printer, and reference numeral 81 represents a low-resolution printer.

The present invention may be applied to a system comprising a plurality of apparatuses, or to an apparatus comprising a single unit. The present invention may also be applied to a case in which the objects of the invention are achieved by supplying a system or an apparatus with programs.

As described above, according to the foregoing embodiments, an image data file can be formed and processed at a high speed in accordance with the use of image data, and the performance of an output apparatus for outputting image data.

As described above, according to the present invention, it is possible to read and display desired image data at a high speed when editing the image data.

According to the present invention, original image data or standard image data whose data amount is smaller than that of the original image data can be used in accordance with the use of the image data.

According to the present invention, moving-image data can be segmented and edited at a high speed.

The individual components shown in outline or designated by blocks in the drawings are all well known in the image processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   image storage means for storing first image data;
   designation means for designating a size of an area on a display means and a number of frames per unit time:
     image generation means for generating second image data from the first image data in accordance with the size of the area and the number of frames per unit time; and display control means for displaying the second image data on the display means.

2. An image processing apparatus according to claim 1, wherein said image storage means also stores header information in which conditions of the generation of the second image data from the first image data are described.

3. An image processing apparatus according to claim 1, wherein the second image data is used for an editing operation, and wherein the first image data is used for output of a hard copy or a soft copy.

4. An image processing apparatus according to claim 2, wherein the second image data includes a hierarchical structure comprising a plurality of layers, and wherein the header information includes header information of image data of other layers.

5. An image processing apparatus according to claim 4, wherein image data of one of the plurality of layers can designate contents of the corresponding image by itself, and wherein image data of the other layers can designate the contents of the corresponding image by combining it with the image data of the one layer.

6. An image processing apparatus according to claim 5, wherein the image data of the other layers comprise high-frequency luminance components.

7. An image processing apparatus according to claim 5, wherein the image data of the other layers comprise image data remaining after subtracting image data of low layers generated by skipping some of the original image data from the original image data.

8. An image processing apparatus according to any one of claims 1, 2 and 3–7, wherein the original image data comprises moving image data.

9. An image processing method comprising the steps of:

designating a size of an area on a display means and a number of frames per unit time:

generating second image data from first image data stored in storage means in accordance with the size of the area and the number of frames per unit time; and displaying the second image data on the display means.

10. An image processing method according to claim 9, wherein header information in which conditions of the generation of the second image data from the first image data are described is also stored in the storage means.

11. An image processing method according to claim 9, wherein the second image data is used for an editing operation, and wherein the first image data is used for output of a hard copy or a soft copy.

12. An image processing method according to claim 10, wherein the second image data includes a hierarchical structure comprising a plurality of layers, and wherein the header information includes header information of image data of other layers.

13. An image processing method according to claim 12, wherein image data of one of the plurality of layers can designate contents of the corresponding image by itself, and wherein image data of the other layers can designate the contents of the corresponding image by combining it with the image data of the one layer.

* * * * *

UNITED STATES PATENT AND TRADEMARK OFFICE
CERTIFICATE OF CORRECTION

PATENT NO. : 6,101,292

DATED : August 8, 2000

INVENTOR(S) : YOSHIROU UDAGAWA ET AL.

It is certified that error appears in the above-identified patent and that said Letters Patent is hereby corrected as shown below:

COLUMN 2:

Line 21, "considerably" should read --highly--; and
    Line 30, "layed" should read --laid--.

COLUMN 5:

Line 67, "203" should read --202--.

COLUMN 6:

Line 21, "arbitrary" should read --arbitrarily--; and
    Line 66, "layed" should read --laid--.

COLUMN 7:

Line 37, "layed" should read --laid--;
    Line 39, "layed" should read --laid--;
    Line 40, "layed" should read --laid--; and
    Line 67, "layed" should read --laid--.

COLUMN 8:

Line 5, "layed" should read --laid--; and
    Line 12, "layed" should read --laid--.

UNITED STATES PATENT AND TRADEMARK OFFICE
CERTIFICATE OF CORRECTION

PATENT NO. : 6,101,292
DATED : August 8, 2000
INVENTOR(S) : YOSHIROU UDAGAWA ET AL.

It is certified that error appears in the above-identified patent and that said Letters Patent is hereby corrected as shown below:

<u>COLUMN 9</u>:

Line 2, "layed" should read --laid--.

Signed and Sealed this

Eighth Day of May, 2001

Attest:

NICHOLAS P. GODICI

Attesting Officer

Acting Director of the United States Patent and Trademark Office